(12) United States Patent
Chalmers

(10) Patent No.: US 9,924,701 B1
(45) Date of Patent: Mar. 27, 2018

(54) CAT OPERATED WATER FOUNTAIN

(71) Applicant: Steven Chalmers, Castle Rock, CO (US)

(72) Inventor: Steven Chalmers, Castle Rock, CO (US)

( * ) Notice: Subject to any disclaimer, the term of this patent is extended or adjusted under 35 U.S.C. 154(b) by 180 days.

(21) Appl. No.: 15/154,952

(22) Filed: May 14, 2016

(51) Int. Cl.
*A01K 7/06* (2006.01)

(52) U.S. Cl.
CPC .................................... *A01K 7/06* (2013.01)

(58) Field of Classification Search
CPC ........................................................ A01K 7/06
USPC ............................................... 119/75, 76
See application file for complete search history.

(56) References Cited

U.S. PATENT DOCUMENTS

| | | | |
|---|---|---|---|
| 3,272,181 A | 9/1966 | Ramsey | |
| 4,469,049 A | 9/1984 | Waynick | |
| 4,924,812 A * | 5/1990 | Bernays, Jr. | ............. A01K 7/06 119/76 |
| 6,202,594 B1 * | 3/2001 | Kirschner | ................. A01K 7/02 119/72 |
| 6,279,508 B1 * | 8/2001 | Marchant | ............... A01K 7/022 119/62 |
| 9,353,885 B1 * | 5/2016 | Smith | ....................... A01K 7/06 |
| 2008/0163821 A1 | 7/2008 | Lytle | |
| 2009/0194032 A1 | 8/2009 | Johnson | |
| 2010/0139790 A1 | 6/2010 | Jockusch et al. | |
| 2010/0326551 A1 * | 12/2010 | Houghton | ............... E03C 1/052 137/625.4 |
| 2014/0251223 A1 | 9/2014 | Rowe et al. | |

* cited by examiner

*Primary Examiner* — Ruth Ilan
(74) *Attorney, Agent, or Firm* — Edwin H. Crabtree; Ramon L. Pizarro

(57) ABSTRACT

A cat operated water fountain adapted for attaching to an indoor water faucet with a water sink. The water fountain includes a water diverter for mounting on the water faucet. The fountain also includes a water tube attached to the water diverter and to a pressure valve mounted on a pressure pad. The pressure pad is adapted for placing on a counter top next to the water faucet. Further, the fountain includes an inverted "J" shaped water spigot. A lower end of the water spigot is attached to the pressure valve. An upper end of the water spigot is placed over the water sink. When a cat stands on top of the pressure pad, the weight of the cat opens the pressure valve and water is directed through the water tube, through the pressure valve and through the water spigot for providing the cat a fresh drink of water.

15 Claims, 2 Drawing Sheets

CAT OPERATED WATER FOUNTAIN

BACKGROUND OF THE INVENTION

(a) Field of the Invention

This invention relates to an indoor water fountain for a cat and more particularly, but not by way of limitation, to a water fountain mounted next to a water sink and operated by a cat for providing the cat a fresh drink of water.

(b) Discussion of Prior Art

Heretofore, there have been a number of different types of water devices for large and small animals. In particular, U.S. 2008/0163821 patent application publication to Lytle discloses an outside dog fountain connected to a garden water hose. A dog, standing on a paddle can activate a valve for providing an upward stray of water for a drink by a pet dog. Also, U.S. Patent Application Publications 2009/0194032 to Johnson, 2014/0251223 to Rowe et al., 2010/0139790 to Johnson et al., and U.S. Pat. No. 3,272,181 to Ramsey and U.S. Pat. No. 4,469,049 to Waynick disclose different types of watering devices for animals and pets. None of these prior art references disclose or suggest the unique features, advantages and objects of the subject indoor, cat operated water fountain as described herein.

SUMMARY OF THE INVENTION

In view of the foregoing, it is a primary objective of the subject invention to provide an indoor water fountain that can be turned on by a cat for a fresh drink of water.

Another object of the invention is the water fountain can be easily attached to a water supply line to a kitchen faucet, a bathroom faucet, and any other indoor faucet with a water sink.

Still another object of the invention is the inclusion of a water spigot disposed next to the water sink. The spigot is held in a closed position until the cat activates a pressure valve. At this time, the water is turned on through the spigot for providing the cat with a drink of water.

The subject invention includes a water diverter adapted for attaching to an indoor water faucet with water sink. The water diverter is connected to one end of a water tube. Also, the water tube can be connected directly to a cold water line to the water faucet without the use of the water diverter. An opposite end of the water tube is connected to a pressure valve mounted on a thin sheet, plastic, pressure pad. The pressure pad is adapted for placing on a counter top next to the water faucet. A lower end of an inverted "J" shaped water spigot is attached to pressure valve. An upper end of the water spigot is placed over the water sink. When a cat stands on top of the pressure pad, the weight of the cat opens the pressure valve. At this time, water is directed through the water tube, through the pressure valve and through the water spigot into the sink. The cat can then lean his or her head forward and next to the upper end of the water spigot for a fresh drink of water.

These and other objects of the present invention will become apparent to those familiar with watering devices for animals when reviewing the following detailed description, showing novel construction, combination, and elements as described, and more particularly defined by the claims, it being understood that changes in the embodiments to the disclosed invention are meant to be included as coming within the scope of the claims, except insofar as they may be precluded by prior art references.

BRIEF DESCRIPTION OF THE DRAWINGS

The accompanying drawings illustrate complete preferred embodiments in the present invention according to the best modes presently devised for the practical application of the subject water fountain, and in which.

DETAILED DESCRIPTION OF THE PREFERRED EMBODIMENTS

Figure 1:
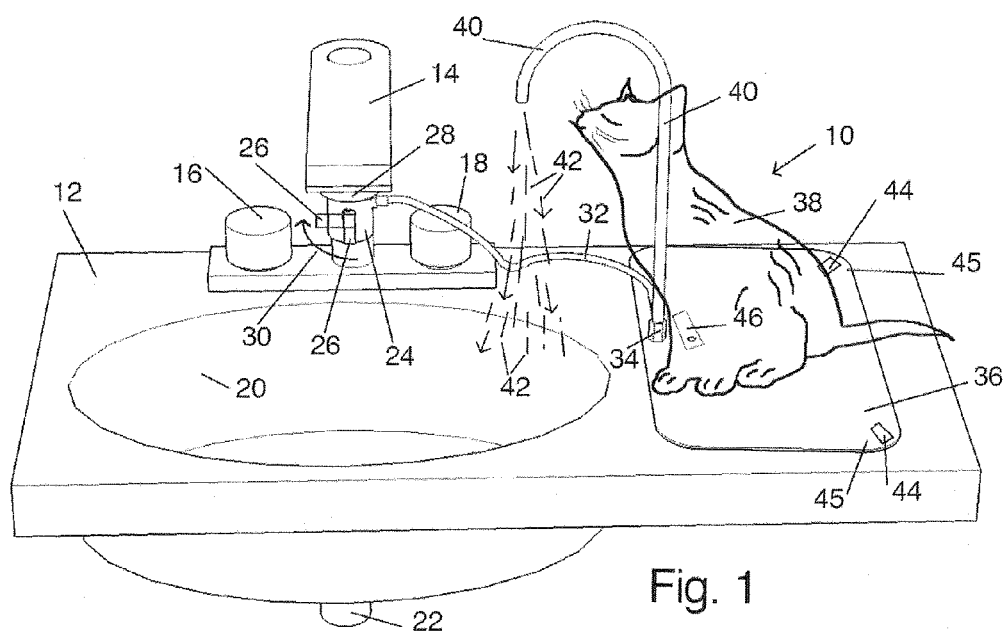
FIG. 1 is a front perspective view of the water fountain and attached to an indoor water faucet and water sink.

In FIG. 1, a front perspective view of the subject water fountain is shown and having a general reference numeral 10. The water fountain 10 is adapted for mounting on top of a cabinet top 12 and next to a water faucet 14. The water faucet 14 includes a hot water handle 16 and a cold water handle 18. The faucet 14 is mounted above a water sink 20 with a water drain 22.

The water fountain 10 includes a water diverter 24 with a handle 26. The water diverter 24 is adapted for attaching to a water outlet 28 in the faucet 14. By moving the handle 26, as indicated by arrow 30, from a vertical position to a horizontal position, water is directed through one end of a water tube 32. While the water diverter 24 is shown in the drawings, it should be understood the subject water fountain can work equally well with the water tube 32 connected directly to a water line supplying cold water to the faucet 14.

An opposite end of the water tube 32 is connected to a pressure valve 34. The pressure valve 34 is attached to one side of a light weight, thin sheet, plastic, pressure pad 36. A cat 38 is shown standing on the pad 36 with his or her head disposed over a portion of the water sink 20.

A lower end of an inverted, "J" shaped spigot 40 is attached to a top of the pressure valve 34. An upper end of the spigot 40 is disposed above the water sink 20 for directing water, indicated by arrows 42, into the sink 20 and while the cat 38 is getting a drink of water.

The water fountain 10 can also include adhesive tabs or Velcro (hook and loop fastener) fasteners 44 attached to the bottom of opposite far corners 45 of the pad 36, for holding the pad 36 on top of the cabinet top 12 and preventing the pad from sliding on the cabinet top. Also and more importantly, the fasteners 44 act as a hinge between the pad 36 and cabinet top 12, when the weight of the cat 38 pivots the pad for opening the pressure valve 34, as shown in FIG. 3.

Further, the pad 36 can include a rotatable training tab 46, mounted on the bottom of the pad and used to rotate under and engage a plunger 47 of the valve 34. The tab 46 is used to move the plunger 47 upwardly into the valve for holding it in an open position and for a continuous supply of water through the spigot 40. The plunger 47 is shown in an extended position with the valve closed in FIG. 2 and shown in a compressed position with valve open in FIG. 3.

Figure 2:
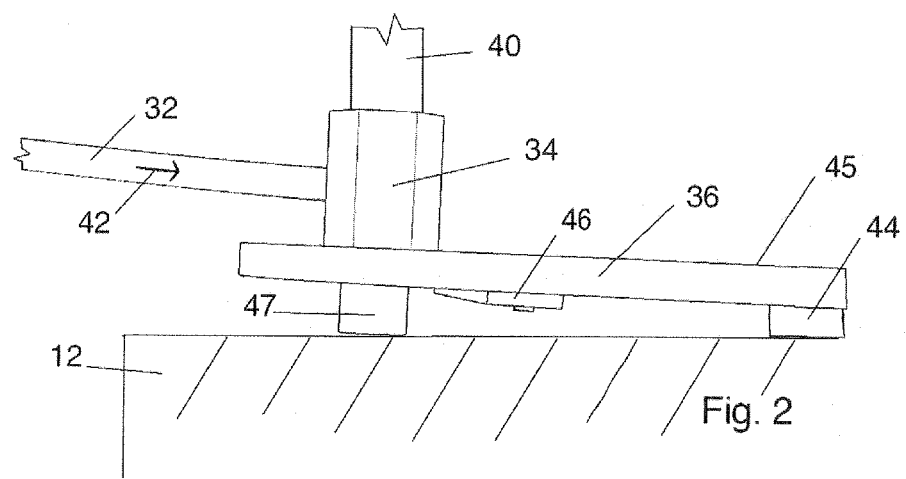
FIG. 2 is a side view of a pressure valve mounted on a weight pressure pad. The valve is shown in a closed position for preventing water into a "J" shaped spigot.

In FIG. 2, a side view of the pressure valve 34 is shown mounted on the weight pressure pad 36. The plunger 47 is shown fully extended downwardly from the valve 34, with the valve in a closed position to prevent water entering the spigot 40.

Figure 3:
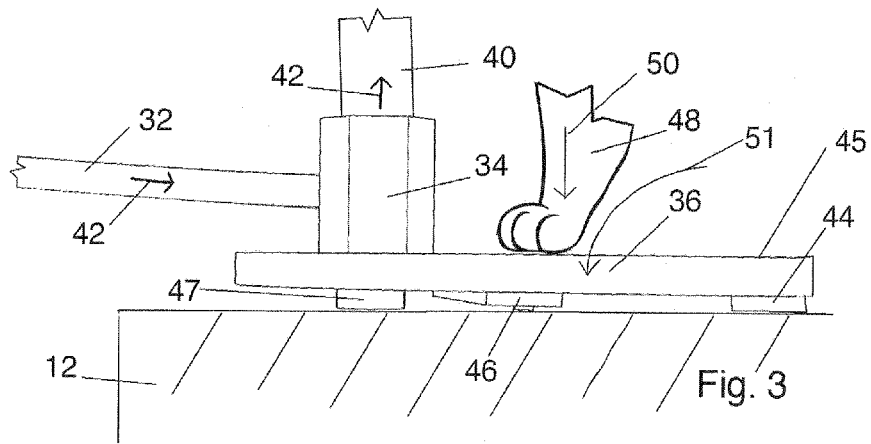
FIG. 3 is another side view of the pressure valve with a paw of a cat and the weight of the cat applying pressure on the weight pressure pad for opening the pressure valve and directing water through the "J" shaped water spigot.

In FIG. 3, another side view of the pressure valve 34 is illustrated with a cat's paw 48 of the cat 38 and the weight of the cat applying pressure, as indicated by arrow 50, on the weight pressure pad 36 and pressing the plunger 47 into the valve 34 for opening the flow of water through the pressure valve to the spigot. Also arrow 51 illustrates the pivoting of the pad 36 on the fasteners 44 as the plunger 47 is compressed inside the valve 34. In this drawing, the water 42 is shown flowing through the water tube 32, through the pressure valve 34 and upwardly through and out the top of the spigot 40, as shown in FIG. 1.

While the invention has been particularly shown, described and illustrated in detail with reference to the preferred embodiments and modifications thereof, it should be understood by those skilled in the art that equivalent changes in form and detail may be made without departing from the true spirit and scope of the invention as claimed except as precluded by the prior art.

The embodiments of the invention for which as exclusive privilege and property right is claimed are defined as follows:

1. A cat operated water fountain adapted for attaching to an indoor water faucet with a water sink, the water fountain comprising:
    a water tube, one end of the water tube attached to a cold water line to the water faucet;
    a pressure valve, an opposite end of the water tube attached to the pressure valve;
    a pressure pad adapted for placing on a counter top next to the water faucet, the pressure valve attached to the pressure pad; and
    a water spigot, a lower end of the water spigot attached to the pressure valve, an upper end of the water spigot placed over the water sink;
    whereby, when a cat stands on top of the pressure pad, the weight of the cat opens the pressure valve, at this time water is directed through the water tube, through the pressure valve and through the water spigot into the sink, the cat can then lean his or her head forward and next to the upper end of the water spigot for a fresh drink of water.

2. The water fountain as described in claim 1 wherein the water spigot has an inverted "J" shaped configuration.

3. The water fountain as described in claim 1 wherein the pressure pad is a thin sheet, plastic, pressure pad.

4. The water fountain as described in claim 1 further including adhesive tabs or fasteners attached to one or more corners of the pressure pad for holding the pressure pad on top of a counter top, the tabs or fasteners also act as a hinge for pivoting the pressure pad on the countertop when the weight of the cat is received on the pad.

5. The water fountain as described in claim 1 further including a training tab mounted on the bottom of the pressure pad and next to the pressure valve, the training tab used for rotating under and holding a plunger in the valve in an open position for supplying a continuous supply of water through the spigot.

6. A cat operated water fountain adapted for attaching to an indoor water faucet with a water sink, the water fountain comprising:
    a water diverter, the water diverter adapted for mounting on the water faucet;
    a water tube, one end of the water tube attached to the water diverter;
    a pressure valve with plunger, an opposite end of the water tube attached to the pressure valve, the plunger used for opening and closing the pressure valve;
    a pressure pad adapted for placing on a counter top next to the water faucet, the pressure valve attached to the pressure pad; and
    a water spigot, a lower end of the water spigot attached to the pressure valve, an upper end of the water spigot placed over the water sink for discharging water into the sink;
    whereby, when a cat stands on top of the pressure pad, the weight of the cat presses the plunger into the pressure valve for opening the pressure valve, at this time water is directed through the water tube, through the pressure valve and through the water spigot into the sink, the cat can then lean his or her head forward and next to the upper end of the water spigot for a fresh drink of water.

7. The water fountain as described in claim 6 wherein the water spigot has an inverted "J" shaped configuration.

8. The water fountain as described in claim 6 wherein the pressure pad is a thin sheet, plastic, pressure pad.

9. The water fountain as described in claim 6 further including double sided adhesive tabs or hook and loop fasteners attached to one or more corners of the pressure pad for holding the pressure pad on top of a counter top, the tabs or fasteners also act as hinges for pivoting the pressure pad on the countertop when the weight of the cat is received on the pad.

10. The water fountain as described in claim 6 further including a rotatable training tab mounted on the bottom of the pressure pad and next to the pressure valve, the training tab used for rotating under and holding the plunger in the valve in an open position for supplying a continuous supply of water through the spigot.

11. A cat operated water fountain adapted for attaching to an indoor water faucet with a water sink, the water fountain comprising:
    a water diverter with handle, the water diverter adapted for mounting on the water faucet, the handle used for directing the flow of water from the water diverter;
    a water tube, one end of the water tube attached to the water diverter;
    a pressure valve with plunger, an opposite end of the water tube attached to the pressure valve, the plunger used for opening and closing the pressure valve;
    an angular-shaped, thin sheet, pressure pad adapted for placing on a counter top next to the water faucet, the pressure valve attached to a side of the pressure pad; and
    a water spigot, a lower end of the water spigot attached to the pressure valve, an upper end of the water spigot placed over the water sink for discharging water into the sink;
    whereby, when a cat stands on top of the pressure pad, the weight of the cat presses the plunger into the pressure valve for opening the pressure valve, at this time water is directed through the water tube, through the pressure valve and through the water spigot into the sink, the cat can then lean his or her head forward and next to the upper end of the water spigot for a fresh drink of water.

12. The water fountain as described in claim 11 wherein the water spigot has an inverted "J" shaped configuration.

13. The water fountain as described in claim 11 wherein the pressure pad is a thin sheet, plastic, pressure pad.

14. The water fountain as described in claim 11 further including double sided adhesive tabs or hook and loop fasteners attached to one or more corners of the pressure pad for holding the pressure pad on top of a counter top, the tabs or fasteners also act as hinges for pivoting the pressure pad on the countertop when the weight of the cat is received on the pad.

15. The water fountain as described in claim 11 further including a rotatable training tab mounted on the bottom of the pressure pad and next to the pressure valve, the training tab for rotating under and holding the plunger in the valve in an open position for supplying a continuous supply of water through the spigot.

\* \* \* \* \*